United States Patent

[15] 3,665,684

White

[45] May 30, 1972

[54] OIL MIST RECLASSIFYING SYSTEM

[72] Inventor: Norman O. White, 32860 Ardwich, Farmington, Mich. 48024

[22] Filed: June 29, 1970

[21] Appl. No.: 50,390

[52] U.S. Cl. ................................55/385, 55/418, 55/462, 55/466, 55/467, 55/529, 184/6.21, 184/55 A, 184/56 R
[51] Int. Cl. ..................................................B01d 55/00
[58] Field of Search ................184/1 R, 1 E, 6.21, 7 R, 55 R, 184/55 A, 56 R, 56 A; 251/125, 127, 118, 355, 369; 55/461, 462, 463, 464, 465, 418, 419, 385, 466, 467, 529

[56] References Cited

UNITED STATES PATENTS

| | | | |
|---|---|---|---|
| 1,824,540 | 9/1931 | Gronkwist | 184/56 R X |
| 1,864,095 | 6/1932 | Rodman et al | 184/6.21 |
| 2,092,235 | 9/1937 | Whittington | 184/6.21 X |
| 2,772,750 | 12/1956 | Bystricky | 55/465 X |
| 2,959,249 | 11/1960 | Gothberg et al | 184/7 |
| 3,131,869 | 5/1964 | Vega et al | 184/55 A X |
| 3,152,333 | 10/1964 | Matt | 184/55 A X |

*Primary Examiner*—Dennis E. Talbert, Jr.
*Attorney*—Benjamin W. Colman

[57] ABSTRACT

Oil mist is created by an oil mist generator, producing micro particles of oil in air by controlling the air pressure to a venturi of the mist producer, generating oil mist at a rate up to 2.5 or more cubic feet per minute. The oil mist rate is directly related to the bearing inches of spindle bearings, boring mill bearings, gear boxes, etc., requiring and served with lubricating oil mist. The system of this invention is designed to receive pressurized oil mist from the vent side of a bearing area, reclassify it into oil droplets, and collect such oil droplets for re-use or discard. A reclassifying valve in the pressurized oil mist system effects reclassification and accumulation of the micro particles of oil from the mist as a component of a vacuum system. The reclassifying valve provides constant visual confirmation of oil mist collection and signals the effective operation of the vacuum system with respect to the oil mist pressure in the valve.

26 Claims, 12 Drawing Figures

Patented May 30, 1972
3,665,684
3 Sheets-Sheet 1
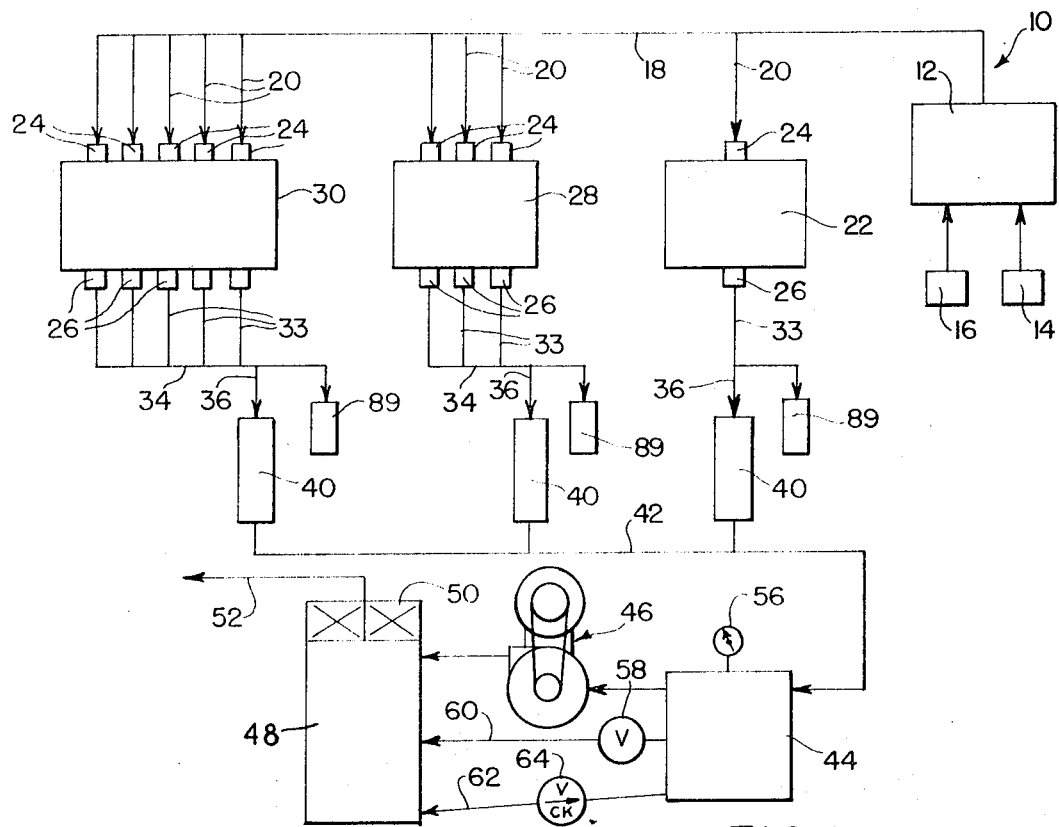
FIG. 1
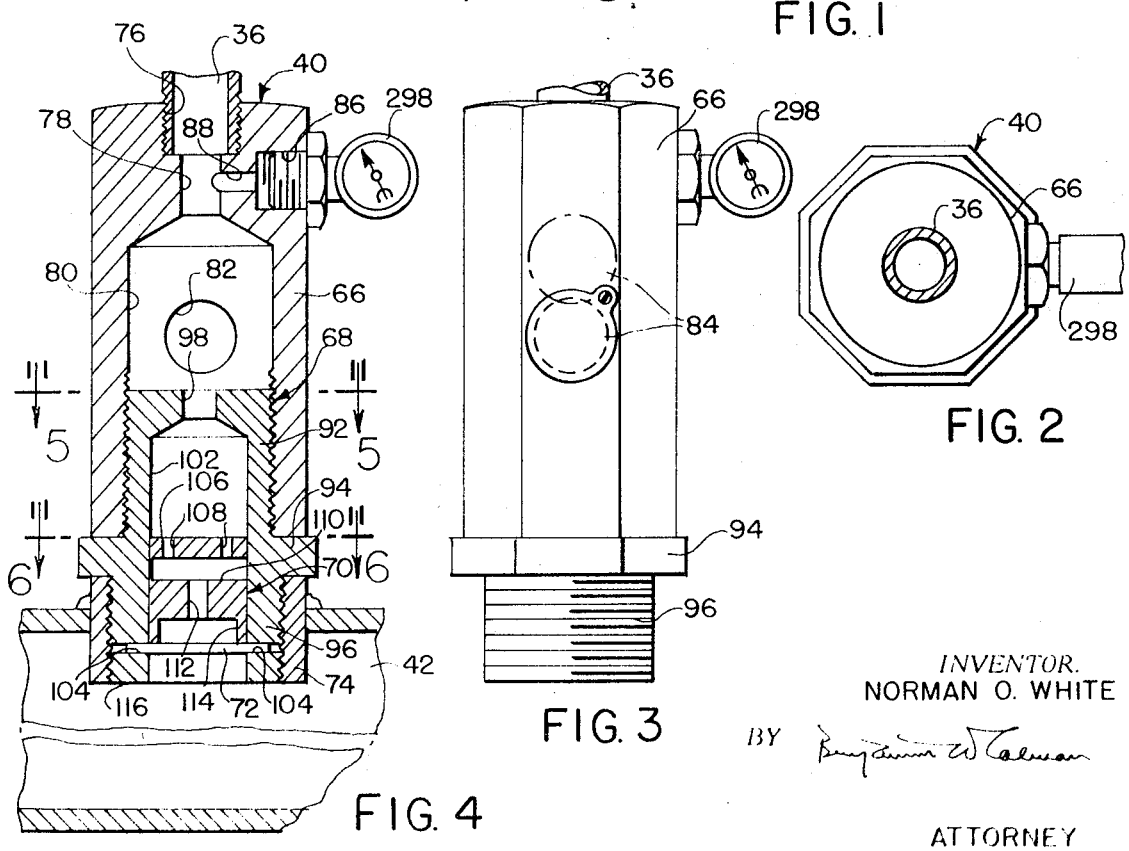
FIG. 2
FIG. 3
FIG. 4
INVENTOR.
NORMAN O. WHITE
BY *Benjamin [signature] Coleman*
ATTORNEY Patented May 30, 1972

INVENTOR.
NORMAN O. WHITE

BY [signature]

ATTORNEY

Patented May 30, 1972

INVENTOR.
NORMAN O. WHITE
BY Benjamin Wolman
ATTORNEY

OIL MIST RECLASSIFYING SYSTEM

The invention involves a system or systems for effective reclassification of micro oil particles generated by oil mist producing device which serves to lubricate one or a plurality of bearing surfaces, including spindle bearings, boring mill bearings, gears and gear boxes, etc., requiring the particular lubrication afforded by an oil mist which enters the bearing area, permeates it and is vented from that area to the atmosphere or, by the invention hereindisclosed, to a reclassifying system for removing the micro particles of oil from the mist and collecting them as oil droplets for re-use or for discard. The vent side of the system includes conduits communicating with the reclassifying valve, a vacuum conduit leading to and communicating with a suction drop-out box, a vacuum pump, and a discharge drop-out box provided with a filter and a discharge conduit to the atmosphere. A modification in the form of a recirculating type system is also described and claimed herein.

It is an object of the invention to provide a system for reclassifying micro particles of oil from an oil mist, to substantially eliminate pollution of air by such oil particles. The elimination of such pollution, particularly in areas having operator-controlled machines requiring oil mist lubrication, is of especial importance at the present time. It is a further object to provide a reclassifying valve in the system that will accept oil mist under pressure, balance such pressure with atmospheric air and a negative pressure or vacuum in the valve. A further object is to provide oil mist reclassifying means in which extremely high velocities of an oil mist are produced therein, and to effect a striking impingement of the micro particles upon a plate member, resulting in the reclassification or accumulation of such particles into droplets, whereby the micro particles are removed from the air and reclassified into liquid form. Still another object is to provide a reclassifying system for oil mist in which the clarified air produced by the reclassification is discharged under pressure and re-introduced into the oil mist generating portion of the system.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a diagrammatic outline of a system according to the invention disclosed herein.

FIG. 2 is a top plan view of an oil mist reclassifying valve.

FIG. 3 is a side elevational view of the valve illustrated in FIG. 2.

FIG. 4 is a vertical sectional view taken substantially on the line 4—4 of FIG. 3 axially of the valve.

Figure 5:
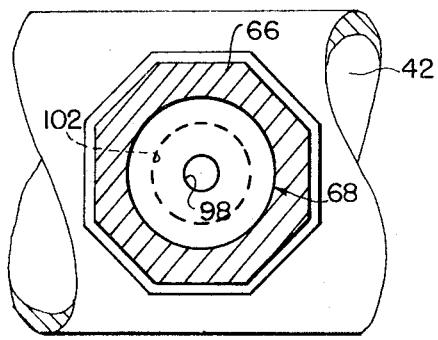
Figure 6:
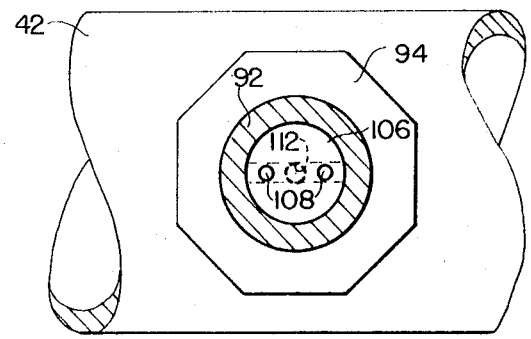

FIGS. 5 and 6 are horizontal sectional views taken substantially on the lines 5—5 and 6—6 of FIG. 4.

Figure 7:
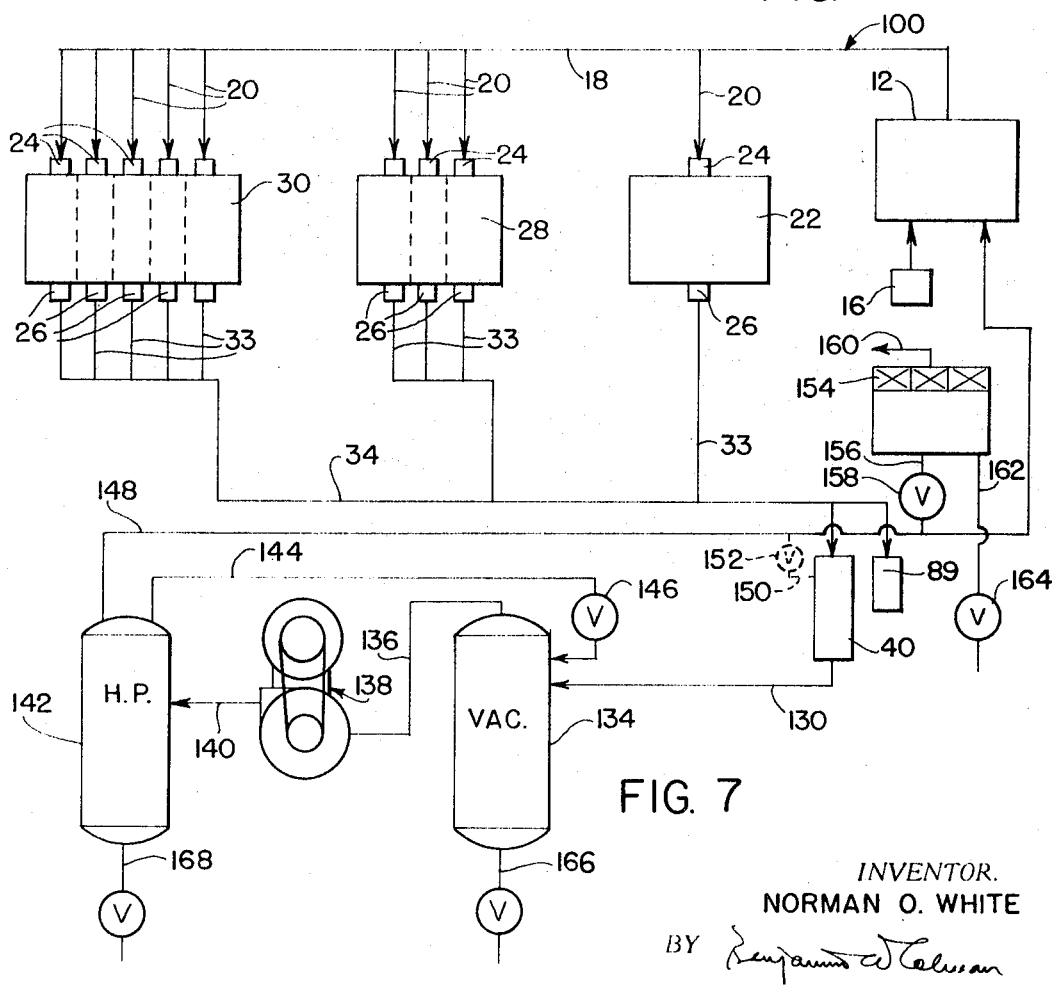

FIG. 7 is a diagrammatic outline of a recirculating system embodying the inventive disclosure.

Figure 8:
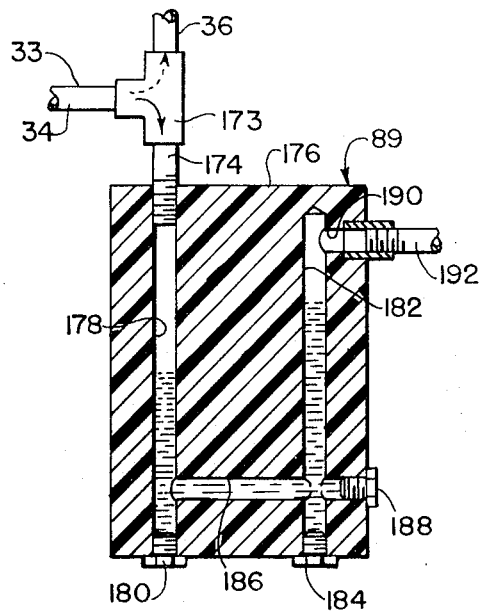

FIG. 8 is a vertical elevational view, partially in section, illustrating a manometer-type drain unit device associated with the vent lines of the system.

Figure 9:
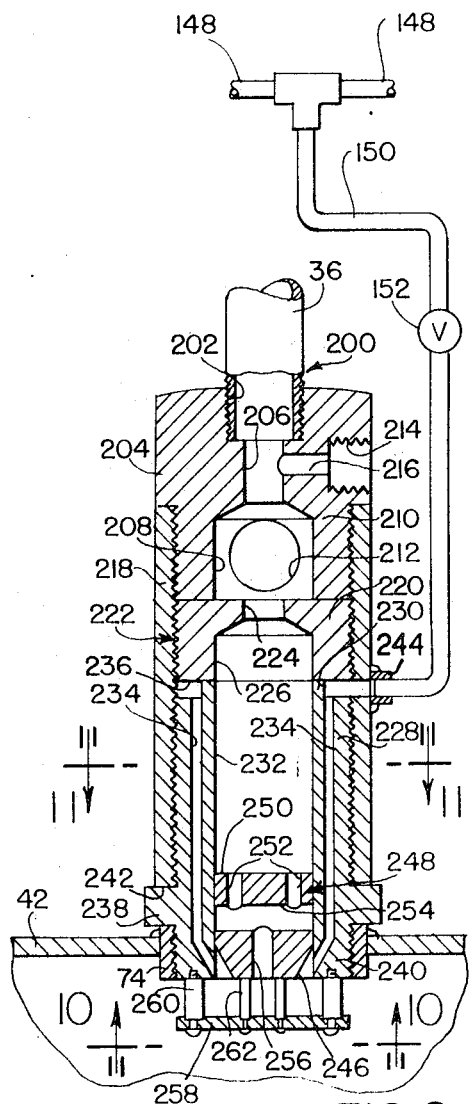

FIG. 9 is a vertical sectional view, similar to that illustrated in FIG. 4, illustrating a modification of the oil mist reclassifying valve.

Figure 10:
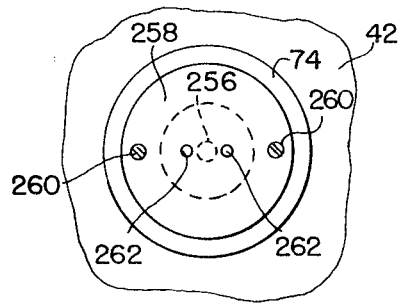

FIG. 10 is a bottom plane view of FIG. 9 taken substantially on the line 10—10 of FIG. 9.

Figure 11:
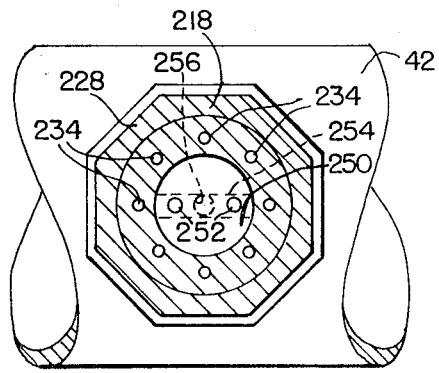

FIG. 11 is a horizontal sectional view taken substantially on the line 11—11 of FIG. 9.

Figure 12:
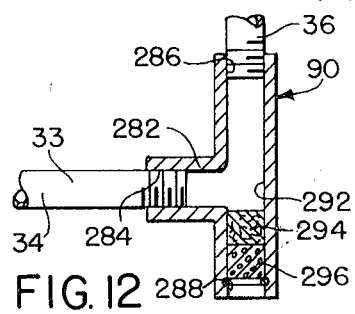

FIG. 12 is a vertical sectional view of an alternate drain unit device associated with the vent lines of the system.

Referring more particularly to FIG. 1, and also to FIG. 7 wherein several of the same elements are embodied in the recirculating system, the systems 10 and 100 (FIG. 7) embody an oil mist generating unit 12 served by a source of compressed air 14 and a source of lubricating oil 16, an oil mist header or conduit 18 serving feeder lines 20 for the oil mist to devices requiring oil mist lubrication such as, for example, a gear box 22 having gears therein and provided with an inlet oil mist metering-type fitting 24 and a vent fitting 26 for the oil mist, a boring mill 28 having similar inlets 24 and vents 26 to and from the bearing areas in the mill, and any number of spindles 30 having similar inlets 24 and vents 26 to and from the bearing or bearings for each such spindle. Each vent fitting 26 whether from a spindle bearing, a boring mill bearing, or a gear box, or from any other lubricated area, is connected by a conduit either directly to an oil mist reclassifying valve or assembly 40 or to a manifold 34 in turn connected by a conduit 36 to the valve 40. The discharge side of the reclassifying valve 40 is connected by a conduit 42 to a vacuum or suction drop-out chamber 44 which is served by a motor-driven vacuum pump 46 that discharges air to a discharge drop-out chamber 48 containing a filter 50, and therefrom through an exhaust conduit 52 to the atmosphere. The vacuum drop-out chamber 44 is provided with a vacuum gage 56 having a visually observable dial and indicator. A control valve 58 is provided in the conduit 60 between the vacuum drop-out chamber 44 and the discharge drop-out chamber 48, to balance the vacuum in the chamber 44, established by the cfm. of air drawn in conduit 42, with air pressure in chamber 48. Another conduit 62 connects the chambers 44 and 48 at their lower ends and at vertical angles, and is provided with a check valve 64 for automatically allowing oil to flow from the chamber 44 to the chamber 48 by gravity, when the vacuum pump 46 is not in operation. The conduit 52 extending from the pre-loaded, oil soaked filter area 50 of the discharge drop-out chamber 48 conducts air substantially free of oil mist to the atmosphere, or to a device or system as desired or required.

The gear box 22 is of any conventional or special type or design containing gears or other rotatable members requiring lubrication. The oil mist carried by the feeder line 20 is charged through the inlet 24 to the gear box under pressure of about 12 inches water column, at a rate of about 2½ cubic feet per minute (cfm.), as a typical example. Of course, the oil mist which contains oil in finely divided micro particles borne in air under pressure permeates the entire enclosure of the gear box, lubricating and coating with oil whatever it comes in contact. Because the gear box is a closed system, pressure is maintained therein substantially as introduced, with little if any appreciable reduction and is discharged through the vent 26 and to the vent line 33 connecting with the reclassifying valve 40. The boring mill 28 is provided with one or more bearing areas similarly served with oil mist through inlet fittings 24 and discharge vent fittings 26, as are the spindles identified generally by the reference numeral 30, bearing-mounted in one or more machines served by the header 18 and the feeder lines 20.

The systems 10 and 100 are designed to serve one or a plurality of bearing areas or parts requiring lubrication. Although a number of such bearing areas are here described and referred to, a bearing area constituting the area of a part requiring and utilizing oil mist lubrication, a limiting consideration in the number of such areas that can be served from a single oil mist generator will depend upon the capacity and capability of the generator and the conduits leading to the bearing areas. In order that adequate lubrication be achieved, the bearing areas are served with oil mist applied under pressure, i.e., the air-borne oil particles are normally applied in line 18 with about 12 inches water column pressure at the inlet fitting 24 to the bearing area and issue therefrom with a somewhat reduced amount of pressure at the vent of the bearing area, normally approximately 5 inch water column pressure, so that this area is always substantially filled with oil mist. These values, of course, are merely typical and are subject to variation depending upon the requirements of particular applications. If a vacuum, i.e., negative pressure, were applied directly at the vent, the resultant movement of airborne oil mist would be in a substantially direct path from the inlet 24 to the vent 26 in each such bearing area, with a consequent lack of lubrication in the larger portion requiring lubrication. The flow would be direct and along the path of minimum lubrication. The flow would be direct and along the path of minimum resistance. Such a system, therefore, is not practical nor desirable for oil mist lubrication of bearing areas. Oil mist pressure must be maintained not only at the inlet 24 but also at the discharge vent 26 of each bearing area, to provide the necessary required lubrication.

However, after the oil mist reaches the vent fitting 26 in each instance, the micro particles of oil can now be subjected to treatment and reclassification into a liquid form. Now these oil particles must be reassembled into droplets and liquid form. To achieve this necessary result, the reclassifying valve 40 provides the means for receiving oil mist under pressure and applying a vacuum thereto without destroying the oil mist pressure at the discharge vent 26. The reclassifying valve 40 comprises an outer housing 66, a reclassifying unit 68, a reclassifying element 70, and a detent or retaining pin 72 secured in the unit 68 on the downstream side of the element 70.

The valve unit 40 is threadedly engaged in a bushing 74 fixedly secured in the collection conduit 42 leading to the suction or vacuum drop-out chamber 44. The valve housing 66 is provided with a conduit opening 76 adapted to receive the threaded end of the vent conduit 36, a passage 78 therebelow through which the oil mist is introduced into a chamber 80, the lower part of which is threaded to receive and engage the device 68. The housing 66 is provided with one or more ports 82 through its outer wall communicating with the interior chamber 80 to admit atmospheric air thereto.

The open area of the port or ports 82 is a matter of especial significance and is directly related on the one hand to the vacuum being drawn in the reclassifying valve 40 and on the other hand to the oil mist pressure introduced into the valve chamber 80. If the open area of the port is too small with respect to the vacuum, insufficient air will be drawn through the port 82, causing the oil mist pressure at the vents 26 and in lines 33 and 34 to drop and become a negative pressure, destroying the value of the oil mist lubrication which must have a positive pressure on both sides, inlet and vent, of the bearing area. Should the open area of the port 82 be too large with respect to the oil mist pressure, for a given vacuum in the reclassifying valve 40, the oil mist will, at least partially if not entirely, discharge through port 82 to the atmosphere. Damper 84, among other suitable means, provides an effective means for providing "on line" operative adjustments to effect the desired balancing of positive and negative pressures in the valve chamber 80. The number and areas of such openings 82, whether dampered or not dampered by the pivoting damper plate 84 (FIG. 3), is conditioned upon balancing the input pressure of the oil mist to the chamber 80 as described above.

Another port 86 and passage 88 in the valve body 66 communicate with the oil mist entry conduit 78. Port 86 may be closed with a plug, or it may be used to connect a pressure-indicating dial gage 298 (FIGS. 3 and 4) or a manometer (not shown), to visually signal the presence of positive pressure in the oil mist entering the valve 40 through conduit 36.

The oil mist reclassifying unit 68 comprises the upper body portion 92, a flange 94, and a low body portion 96. The upper body portion 92 is externally threaded and engageable with the internally threaded bore 80 of body 66 up to the flange 94, the lower portion 96 being externally threaded and engageable in the bushing 74 fixedly secured in the conduit 42. The reclassifying unit 68 is further provided with an entry port 98 and an interior chamber 102 in which the reclassifying element 70 is located. The lower body portion 96 of unit 68 is provided adjacent its lower end with an opening 104 adapted to receive and seat the detent pin 72 above which the element 70 is located.

The reclassifying element 70 comprises a body 106, having upper reclassifying ports 108,108, a transverse passage 110, and a central or axial port 112, communicating with a discharge counterbore 114 disposed directly above the pin 72. The lower end 116 of the reclassifying unit 68 is positioned above and spaced substantially from the lower interior wall portion of conduit 42 so that oil mist which is not reclassified in the valve 40 will be brought into contact with such conduit wall surface to frictionally engage the same and accumulate as an oil droplet on its way to the vacuum drop-out chamber 44 and the vacuum pump 46.

As illustrated in FIG. 7, the recirculating system 100 embodies substantially the same elements on the oil mist input side of the system as are described above for the system 10, and to a very large degree the vent side of the system is substantially the same in that the oil mist is discharged under pressure from the vent side of the gear box or bearing areas and moved through vent conduits 33 and manifold 34 to the reclassifying valve 40 which may or may not be coupled as desired with the oil drain 89.

From the reclassifying valve 40, conduit 130 communicates with the vacuum tank 134, which in turn is connected by conduit 136 to the motor-driven vacuum pump 138. The pump in turn is connected by conduit 140 to the high pressure tank 142. The two vacuum and pressure tanks are connected by a by-pass conduit 144 having a valve 146 therein. Valve 146, which is of the automatic pre-set type and can be adjusted to open (and/or close) at a predetermined value, automatically adjusts the vacuum in line 144 to admit air under pressure from tank 142 to the vacuum tank 134, reducing the vacuum in the latter tank to the desired level. Discharge conduit 148, communicating with the high pressure tank 142, connects with and serves to provide an air supply under pressure directly to the oil mist generator 12.

A modification of the system 100 provides for connecting a by-pass air line 150 having a valve 152 therein, with conduit 148 and the modified reclassifying valve 200 described hereinbelow (FIG. 9).

The high pressure air conduit 148 also communicates with the pre-loaded, oil soaked filter unit 154 through conduit 156 having valve 158 therein. The valves 146 and 158 are of the same general type, being automatic pre-set pressure type valves which open when the pre-set negative or positive pressure is reached in lines 144 or 148, respectively. When a predetermined negative pressure is reached in vacuum tank 134, valve 146 opens to admit air pressure from tank 142 thereinto, balancing the vacuum in tank 134 to the desired pre-set vacuum limit. Should the positive pressure in line 148 go above the pre-set limit in valve 158, the valve will open further to reduce the pressure in the line to the desired level. A balanced condition is thus maintained in both the vacuum line 144 and the pressure line 148 by the two valves 146 and 158. Such balanced condition of pressure and vacuum allows pump 138 to more effectively perform its function in producing a controlled vacuum at the reclassifying valves 40 or 200, as the case may be.

Air, substantially free of oil mist, passes to the atmosphere from the filter by way of the discharge conduit 160. A drain line 162, with valve 164 therein, communicates with the bottom oil reservoir portion of the filter unit 154. The vacuum tank 134 and the high pressure tank 142 are provided with valved oil drain lines 166 and 168 respectively.

Normally, conduits 33 leading from the vent fittings 26 at the bearing areas are in a generally depending attitude, and the amount of oil reclassification incident to conduit wall contact in such case is slight. Where a bend in the line occurs, such reclassification is somewhat greater. In any event, some quantity of reclassification is always occurring in the bearing areas and in the conduits leading therefrom. The accumulation of oil droplets in lines 33, and in conduit 34 which is normally on a slope, can in time build up to a point where it will block the conduit 34 at a bend leading upwardly. Reclassifying valves 40 (or 200) are normally positioned at about eye level, and often this will be above the level of the sloping conduit 34, requiring an upward bend in the lines 36 to the valves. At such bends, a substantial accumulation of reclassified oil will effectively block the flow of oil mist and the vacuum action in the reclassifying valves 40. To eliminate such oil blocking, lines 33 or 34, as the case may be, are provided with a manometer-type drain unit 89 (FIG. 8), or a tee-type drain fitting 90 (FIG. 12), into which the oil droplets are drawn and from which they can be discharged or drained.

The manometer-type drain 89 is preferably made of a clear plastic block with the features described below, allowing for visual inspection at all times of oil accumulation in the unit and whether or not the line 33 or 34, to and with which the unit 89 is connected and communicates, is passing oil mist under a positive pressure. The drain unit 89 (FIG. 8) is connected to the conduit 33 or to conduit 34 as indicated in FIG. 1 of the drawings, on the vent side of the bearing area, by a tee-fitting 173 and a conduit 174. The third leg of the tee connects with conduit 36 communicating with the reclassifying valve 40.

The drain unit 89 comprises a body 176 having a first cylindrical passage 178 plugged at its bottom end by a plug 180, a second cylindrical passage 182 substantially parallel with the first passage 178 and plugged at its lower end with a plug 184, and a cross passage 186 connecting the two passages 178 and 182 and plugged at its outer end with a plug 188. A passage 190 leading from and communicating with the upper end of passage 182 communicates with the conduit 192 that is coupled to the body 176 at the discharge end of passage 190. Conduit 192 is an oil drain discharge tube for draining oil to a catch basin or tank not shown.

Thus, oil droplets which drain from the vent line 33 or the sloped line 34 run into the passages 178, 186 and 182. If the oil mist in line 33 or 34 is under positive pressure, the oil level in parallel passage 178 will be observed to be lower than the oil level in parallel passage 182, indicating that the oil mist lubricating portion of the system is operating properly. Should the levels in the two passages 178 and 182 be the same, or the oil level in passage 182 be lower than in passage 178, it will be an indication that the oil mist pressure in the bearing area is at zero pressure or under vacuum, respectively, either condition being unsatisfactory for adequate and proper lubrication in the bearing area.

The modified reclassifying valve 200 (FIGS. 9, 10 and 11) provides for the application of additional air pressure to increase the vacuum at the discharge end of the valve, whereby substantially higher velocities are obtained and greater and more effective and more complete reclassification of the micro particles of oil is achieved. The reclassifying valve 200 is quite similar in many respects to the valve 40. The modified valve is provided with a threaded inlet opening 202 adapted to threadedly receive and engage the oil mist inlet conduit 33, a body 204 having an entry port 206 communicating with the conduit 33 and a pressure-balancing chamber 208 directly therebelow, an externally threaded hub portion 210 and one or more ports 212 communicating with chamber 208 and the atmosphere and disposed through the wall of the hub portion 210. Where desired or required, a threaded inlet gage or manometer port 214 with passage 216 communicating with the port 206 is provided in the body 204.

An internally threaded coupling sleeve 218 is threadedly engaged with the hub 210 and receives the externally threaded body 220 forming the upper portion of the reclassifying unit 222. The body 220 is provided with an entry port 224 communicating with the balancing chamber 208 and the chamber 226 directly therebelow. The lower portion of the reclassifying unit 222 comprises a body portion 228 having an external thread adapted to threadedly engage the internally threaded bore of the sleeve 218, a hub section 230 at its upper end of substantially reduced diameter and adapted to seat against the lower end of the body 220, an internal chamber 232 aligned with and in register with the chamber 226 of the upper body portion 220, a plurality of longitudinally extending passageways 234 communicating with the annular passageway 236 about the hub portion 230, a flange 238 and a distal portion 240 of body 228 below the flange 238 which is adapted to seat against the lower end 242 of the sleeve 218. Conduit 150 is connected by a coupling member 244 secured to the outer wall of the sleeve 218 and communicates with the annular passage 236.

The lower ends of the air passageways 234 are directed angularly inwardly toward the axis of the valve and the reclassifying unit 222 so that air under pressure will flow tangentially to and wash across the lower end 246 of the reclassifying element 248 which comprises a body 250, entry ports 252,252 communicating with the chamber 232 and the transverse bore 254, and the discharge port 256 at the distal end 246 of the element 248. The end portion 246 is tapered inwardly allowing air discharged under pressure from the passageways 234 to wash tangentially across and thus increase substantially the velocity of the air mist issuing from the discharge port 256.

An impingement plate 258 is secured to and spaced from the lower end of the body portion 240 by the stop pins or screws 260,260, and the cylindrical reclassifying element 248 is maintained in position in the bore or chamber 232 by the detent pins 262,262 which abut the distal end 246 of the element.

As in the case of the valve 40 described above, the modified valve 200 is adapted to be secured in the conduit 42 by the coupling member 74 fixedly attached in the conduit and provided with an internal thread adapted to threadedly engage and secure the lower body portion 240 of the reclassifying unit 222.

The oil drain tee-type fitting or device 90 is illustrated in FIG. 12. It is an alternative device, in place of the manometer type drain unit 89 or may be used along with unit 89 in the same system, where more than one conduit oil drain device is required. The drain device 90 comprises a tee-shaped body 282 having a threaded inlet 284 adapted to receive and connect with conduit 33 or 34, as the case may be, a threaded outlet 286 adapted to connect with conduit 36 communicating with valves 40 or 200, and a drain outlet 288. Positioned in the chamber area 292 above outlet 288 are an upper filter element 294 composed of filamentary fiberglass compacted into a very dense cylindrical disc of substantial thickness, and a lower disc shaped element 296 of foamed polystyrene having relatively large pores adapted to receive and hold oil passed through the filter element 294, and having a rigidity and physical strength sufficient to adequately support the filter element 294 during operation of the system and under the loads applied by the negative pressure of the oil mist flow through the drain unit 90. The oil collecting and draining function of the drain device 90 is substantially the same as for the device 89 (FIG. 8), but without the readily observable visual indication of oil mist pressure that device 89 affords. As chamber 292 collects and fills with oil, it drains through outlet 288 to a catch basin or other collector (not shown).

As illustrated particularly in FIGS. 3 and 4, a dial type pressure gage 298 can be connected to the reclassifying valve 40 at threaded opening 86 to indicate the presence of positive oil mist pressure in valve passage 78 as oil mist enters from conduit 36. Similarly, such a gage can be attached to reclassifying valve 200 at opening 214 for the same purpose. Alternatively, a manometer (not shown) can be attached to these valves in place of gage 298 for visual indication of oil mist pressure.

In operation, the system of this invention functions as follows. The oil mist rate generated (oil consumption) may vary from zero to 2.5 or more cubic feet per minute by controlling the air pressure from the supply 14 to the venturi of the oil mist generator (shown only in block diagram). The oil mist is discharged from the generator 12 into the header conduit 18 which is sized to prevent excessive oil wet-out in the header, and at about 12 inch water column pressure. The oil mist pressure in the gear box 22, the boring mill bearings 28 or the spindles 30 is controlled and is generally of the order of about 5 inch or more water column pressure minimum.

The oil mist is discharged through the feeder lines 20 to the inlet fittings 24 serving the bearing areas or the areas and devices requiring oil mist lubrication. These areas are generally or substantially closed so that oil mist permeates the entire bearing area and issues from the vent fittings 26 under substantially the same or relatively close to the pressure as introduced at the inlets 24. From the vents the oil mist is conducted through conduits 33, either directly or by manifolds 34 to drain units 89 or 90 and through conduits 36 to the reclassifying valves 40 (or 200).

In the reclassifying valves 40 or 200, as oil mist is introduced through the input conduit to the balancing chamber 80 or 208, respectively, it becomes intermixed with atmospheric air coming into the chamber through the port or ports 82 or 212, which may be partially dampered when required to effect a balance between the atmospheric pressure and the input pressure of the oil mist, as described above. A perfect balance is not desired, in fact, the balance should weigh on the negative side, i.e., the application of negative pressure by the vacuum pump 46 should and will draw air from the atmosphere through the port 82 or 212 into the balancing chamber 80 or 208, respectively, thus effecting a movement of the oil mist through the reclassifying unit 68 and the reclassifying element 70 (222 and 248 of valve 200).

As the oil mist travels through the reclassifying unit chamber 102, it enters the reclassifying ports 108 at an increasing velocity and when passing through these ports, the total area of which is about one-half the area of the passageway 110, the velocity of oil mist flow substantially increases and impingement and reclassification of the micro particles of oil occurs upon the interior wall of the passage 110. As the oil mist flow continues through the discharge port 112, it issues at a further increased velocity and impingement occurs upon the detent bar 72 and also upon the interior wall surface of the conduit 42. Such reclassification is generated by a vacuum of approximately 75 inch water column or 5 inch mercury column effected by the vacuum pump 46. The velocities attained in the reclassifying element 70 are very high and of the order of approximately 13,000 to 26,000 feet per minute. Oil droplets are accumulated and flow through the conduit 42 to the suction drop-out box 44 where reclassification of the oil mist is substantially complete. The liquid oil collected in the drop-out box 44 may be conducted to the discharge box 48 by way of conduit 60 when the vacuum pump is in operation, or when the latter is not functioning, the liquid oil will flow by gravity through conduit 62 to the discharge box 48. The air drawn by the vacuum pump 46 from the suction box 44 is discharged through the filter 50 and the conduit 52 to the atmosphere, in the system 10 as illustrated in FIG. 1.

The function of valve 58, which is either manually operable or of the automatically controlled type, is to adjust the vacuum or negative pressure in the suction chamber 44 by admitting air pressure from the chamber 48 by way of conduit 60 thereinto. For example, should the vacuum in conduit 42 require 8 cfm. only and pump 46 be developing 10 cfm. with consequent increase in negative pressure, valve 58 is opened to recirculate 2 cfm. to the chamber 44 and reduce the vacuum in the conduits 33, 34, 36 and 42 to the desired level.

However, where a recirculating system, such as the system 100 illustrated in FIG. 7, requires or can utilize the discharge air from the vacuum pump, such air is introduced by the pump 138 into the high pressure tank 142 from which it is discharged through conduit 148 back to the oil mist generator 12.

The modification illustrated in FIG. 9 utilizes the discharge of high pressure air through conduits 148 and 150 back to the reclassifying valve 200 wherein this air is introduced through conduit 150 into the annular passage 236 and the passageways 234 to wash across the discharge end 246 of the reclassifying element 248 whereby further increased velocity of the oil mist is attained and impingement of the micro particles upon the plate member 258 substantially effects reclassification of the oil in the mist. Valve 152 in conduit 150 can be closed to shut off the supplementary flow of air in valve 200 should it be found unnecessary in view of adequate negative pressure applied through conduit 42.

It will be noted that the impingement detent bar 72 and the plate member 258 are spaced slightly from the discharge ends of the ports 112 and 256 respectively, permitting and providing impingement over a substantially larger area than the area of the exit end of the ports respectively.

Although certain particular embodiments of the invention are hereindisclosed for purposes of explanation, further modifications thereof, after study of this specification, will become apparent to those skilled in the art to which the invention pertains. Reference should be had to the appended claims in determining the scope of the invention.

I claim:

1. In a system for reclassifying micro particles of oil from a lubricating oil mist to liquid droplets of oil and in which said oil mist is delivered under positive pressure to bearing areas requiring lubrication and is vented from said bearing areas under positive pressure, the combination comprising a vent conduit connected to and communicating with said bearing areas, an oil drain device in said vent conduit for receiving reclassified oil therefrom, an oil mist reclassifying assembly connected to and communicating with said vent conduit to receive pressurized oil mist therefrom, a vacuum tank connected by a vacuum tank conduit to said reclassifying assembly to receive reclassified oil therefrom, a vacuum pump connected by a vacuum pump conduit to said vacuum tank to apply negative pressure to said reclassifying assembly, an air discharge tank connected by an air discharge tank conduit to said vacuum pump to receive air substantially free of oil mist therefrom, a pre-loaded, oil soaked filter unit on the downstream side of said air discharge tank to remove the remainder of said oil mist and release air from said air discharge tank, and said oil mist reclassifying assembly comprising a housing,
an inlet in said housing for said vented pressurized oil mist,
a mixing chamber in said housing communicating with said oil mist inlet,
a port through a wall of said housing communicating with said mixing chamber to admit atmospheric air thereinto,
an oil mist reclassifying unit secured to said housing and having
a body,
an oil mist inlet and a vacuum chamber in said body communicating with said mixing chamber,
a reclassifying element in said vacuum chamber having inlet and discharge ports and passageways therethrough providing a tortuous direction-changing path for said oil mist,
and an impingement element disposed in the path of the downstream flow of said oil mist from said discharge port and spaced from the discharge end thereof to reclassify said micro particles of oil upon their impingement,
said reclassifying unit connecting to and communicating with said vacuum tank conduit, said vacuum tank conduit receiving reclassified oil discharged from said reclassifying element.

2. The system defined in claim 1, and including
a pressure regulating conduit connecting and communicating with said vacuum tank and said air discharge tank having a pressure responsive control valve therein for adjustably controlling the negative pressure in said vacuum tank with positive pressurized air from said air discharge tank so as to maintain the negative pressure in said vacuum tank and said reclassifying assembly at a predetermined level.

3. The system defined in claim 1, and including
a check valve conduit connecting and communicating with said vacuum tank and said air discharge tank, arranged at a vertical angle from the former downwardly to the latter tank, and provided with a check valve therein to permit the flow of reclassified oil from the former to the latter tank by gravity when said vacuum pump is inoperative and to restrict such flow when said vacuum pump is operative.

4. The system defined in claim 1, and including
a pressure responsive and indicating device secured to said housing and communicating with said oil mist inlet, 5. The system defined in claim 1, and wherein
the area of said air port through said housing wall to said reclassifying assembly valve mixing chamber is so related to the input positive pressure of said oil mist and the suction negative pressure of said vacuum pump that said oil mist flow is directed into said reclassifying unit.

6. The system defined in claim 5, and including
means for adjustably controlling the open area of said air port through said housing wall.

7. The system defined in claim 6, and wherein
said means for adjustably controlling the open area of said air port comprises a damper device pivotally movable across said port.

8. The system defined in claim 1, and wherein
the inlet and discharge port areas in said reclassifying element are so arranged as to substantially increase the velocity of oil mist flow through said reclassifying element under the negative pressure applied thereto by said vacuum pump.

9. The system defined in claim 1, wherein
said reclassifying element comprises
a body,
one or more reclassifying ports for said oil mist extending longitudinally of said body and communicating with a transversely disposed passageway,
the area of said reclassifying ports being substantially about one-half the area of said transversely disposed passageway to accelerate the flow of oil mist through said reclassifying element,
and a discharge port communicating with said transversely disposed passageway for egress of said oil mist therefrom,
the discharge end of said reclassifying element communicates directly with said vacuum tank conduit connecting said reclassifying valve and said vacuum tank.

10. The system defined in claim 1, wherein
said reclassifying unit is threadedly secured in said housing in alignment and communication with said mixing chamber.

11. The system defined in claim 9, wherein
said reclassifying element body is further provided with a counterbore on the downstream side of said oil mist discharge port to provide spacing between the exit end of said discharge port and said impingement element therebelow.

12. In the system defined in claim 1 wherein
said housing is provided with a plurality of ports through a wall thereof communicating with said mixing chamber to admit atmospheric air thereinto.

13. The system defined in claim 1, wherein
said reclassifying element is slidably movable in said reclassifying unit vacuum chamber.

14. In a recirculating system for reclassifying micro particles of oil from a lubricating oil mist to liquid droplets of oil and in which said oil mist is delivered under positive pressure by an oil mist generator conduit-connected to bearing areas requiring lubication and is vented from said bearing areas under positive pressure, the combination comprising a vent conduit for said pressurized oil mist connected to and communicating with said bearing areas, an oil drain device in said vent conduit for receiving reclassified oil therefrom, an oil mist reclassifying assembly connected to and communicating with said vent conduit to receive pressurized oil mist therefrom, a vacuum tank connected by a vacuum tank conduit to said reclassifying assembly to receive reclassified oil therefrom, a vacuum pump connected by a vacuum pump conduit to said vacuum tank to apply negative pressure to said reclassifying assembly, a high pressure tank connected by a high pressure tank conduit to said vacuum pump on the discharge side thereof, a high pressure tank outlet conduit connecting and communicating with said high pressure tank and said oil mist generator to provide a pressurized air supply to said generator, an air discharge chamber connected by an air discharge chamber conduit to said high pressure tank to receive air substantially free of oil mist therefrom, a pre-loaded, oil soaked filter unit on the downstream side of said air discharge chamber to remove the remainder of said oil mist and release air from said air discharge chamber, a pressure control valve in said air discharge tank conduit connecting said high pressure tank and said air discharge chamber for adjustably controlling the air pressure in said high pressure tank,
and said oil mist reclassifying assembly comprising
a housing,
an inlet in said housing for said vented pressurized oil mist,
a mixing chamber in said housing communicating with said oil mist inlet,
a port through a wall of said housing communicating with said mixing chamber to admit atmospheric air thereinto,
an oil mist reclassifying unit secured to said housing and having
a body,
an oil mist inlet and a vacuum chamber in said body communicating with said mixing chamber,
an annular groove in said body and within said housing defining an air inlet chamber,
passageways through said body communicating with said groove and extending longitudinally of said reclassifying unit to discharge openings adjacent the distal end of said reclassifying unit,
conduit means connected to said housing for conducting pressurized air to said annular groove and said longitudinally extending passageways through said reclassifying unit,
a reclassifying element in said latter vacuum chamber having inlet and discharge ports and passageways therethrough providing a tortuous direction-changing path for said oil mist,
said air-conducting passageways terminating adjacent the distal end of said reclassifying element and in an attitude thereto so as to direct said pressurized air tangentially to discharge port of said reclassifying element,
and an impingement element disposed in the path of the downstream flow of said oil mist from said discharge port and spaced from the discharge end thereof to reclassify said micro particles of oil upon their impingement,
said reclassifying unit connecting and communicating with said vacuum tank conduit connected to said vacuum tank for receiving reclassified oil discharged from said reclassifying element.

15. The system defined in claim 14, and including
a pressure regulating conduit connecting and communicating with said vacuum tank and said high pressure tank having a pressure responsive control valve therein for adjustably controlling the negative pressure in said vacuum tank with positive pressurized air from said high pressure tank so as to maintain the negative pressure in said vacuum tank and said reclassifying assembly at a predetermined level.

16. The system defined in claim 14, and including
a pressure responsive and indicating device secured to said housing and communicating with said oil mist inlet.

17. The system defined in claim 14, and wherein
the area of said air port through said housing wall to said reclassifying assembly valve mixing chamber is so related to the input positive pressure of said oil mist and the suction negative pressure of said vacuum pump that said oil mist flow is directed into said reclassifying unit.

18. The system defined in claim 17, and including means for adjustably controlling the open area of said air port through said housing wall.

19. The system defined in claim 18, and wherein
said means for adjustably controlling the open area of said air port comprises a damper device pivotally movable across said port.

20. The system defined in claim 14, and wherein
the inlet and discharge port areas in said reclassifying element are so arranged as to substantially increase the velocity of oil mist flow through said reclassifying element under the negative pressure applied thereto by said vacuum pump.

21. The system defined in claim 14, wherein
said reclassifying element comprises
a body,
one or more reclassifying ports for said oil mist extending longitudinally of said body and communicating with a transversely disposed passageway,
the area of said reclassifying ports being substantially about one-half the area of said transversely disposed passageway to accelerate the flow of oil mist through said reclassifying element,
and a discharge port communicating with said transversely disposed passageway for egress of said oil mist therefrom,
the discharge end of said reclassifying element communicates directly with said vacuum tank conduit connecting said reclassifying valve and said vacuum tank.

22. The system defined in claim 21, wherein
said reclassifying element body is further provided with a counterbore on the downstream side of said oil mist discharge port to provide spacing between the exit end of said discharge port and said impingement element therebelow.

23. The system defined in claim 14, wherein
said reclassifying unit is threadedly secured in said assembly housing in alignment and communication with said assembly mixing chamber.

24. In the system defined in claim 14, wherein
said housing is provided with a plurality of ports through a wall thereof communicating with said mixing chamber to admit atmospheric air thereinto.

25. The system defined in claim 14, wherein
said reclassifying element is slidably movable in said reclassifying unit vacuum chamber.

26. The system defined in claim 14, and including
a pressurized air supply conduit communicating with said reclassifying unit annular groove and said high pressure tank outlet conduit connecting and communicating with said high pressure tank and said oil mist generator, to supply said reclassifying unit longitudinally extending passageways with pressurized air,
and a pressure responsive control valve in said pressurized air supply conduit communicating with said reclassifying unit annular groove to adjustably control said pressurized air supply to said reclassifying unit.

* * * * *